United States Patent [19]

Odier

[11] 4,244,644
[45] Jan. 13, 1981

[54] METHOD AND APPARATUS FOR SERIES PHOTOGRAPHY OF A SUBJECT IN MOTION

[76] Inventor: Marc Odier, 85, Boulevard Exelmans, 75016 Paris, France

[21] Appl. No.: 34,981

[22] Filed: May 1, 1979

[30] Foreign Application Priority Data

May 3, 1978 [FR] France ............................... 78 13117

[51] Int. Cl.³ .................... G03B 11/00; G03B 15/16
[52] U.S. Cl. .................................. 354/122; 354/110; 354/120; 354/295
[58] Field of Search ............... 354/120, 94, 290, 291, 354/296, 122, 125, 105–111, 295, 293; 352/121, 46, 82, 83

[56] References Cited

U.S. PATENT DOCUMENTS

| | | | |
|---|---|---|---|
| 1,263,619 | 4/1918 | Stanley | 354/125 |
| 1,390,246 | 9/1921 | Leonard | 354/296 |
| 2,106,659 | 1/1938 | Rentmeesters | 354/124 |
| 2,420,339 | 5/1947 | Rabinow | 354/125 |
| 2,460,163 | 1/1949 | Bowen | 354/125 |
| 2,972,931 | 2/1961 | Roob | 354/296 X |
| 3,580,153 | 5/1971 | Fukushima | 354/125 |
| 3,604,328 | 9/1971 | Nakagawa | 354/296 X |
| 3,719,128 | 3/1973 | Simmons | 354/122 |
| 3,952,322 | 4/1976 | Wolfe | 354/290 |

FOREIGN PATENT DOCUMENTS 47-44648 11/1972 Japan ..................................... 354/120

Primary Examiner—J. V. Truhe
Assistant Examiner—Shelley Wade
Attorney, Agent, or Firm—Charles E. Brown

[57] ABSTRACT

A method and apparatus for series photography using a "still" camera for taking a series of discrete shots on a single frame of film of the subject in motion relative to the camera. A field stop is mounted on a base in front of the camera lens, the distance from the camera and the size of the aperture in the field stop being such that it reduces the effective total field of view of the camera to a portion thereof. The field stop is mounted for displacements in all directions in its plane. An operating member permits the operator to displace the field stop continuously following the displacement of the subject in motion, for example, by means of a movable finder mark mounted on the operating member for movement with respect to a viewfinder frame fixed on the base. In one embodiment the shutter of the camera is employed and in another an additional shutter is mounted between the lens of the camera and the field stop. In the former embodiment various means are disclosed for controlling the shutter release mechanism of the camera in order to effectively automatically follow the subject in motion.

21 Claims, 14 Drawing Figures

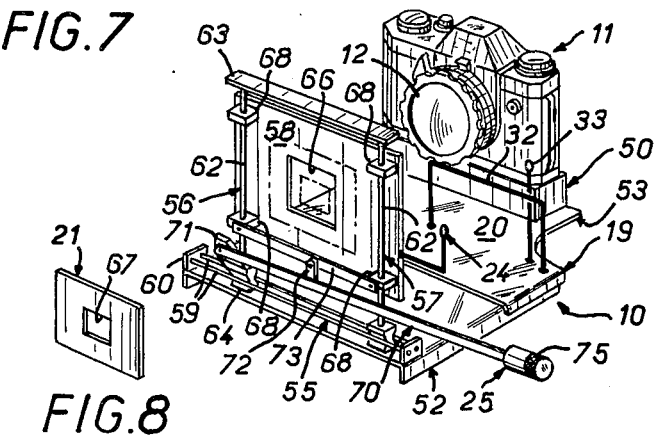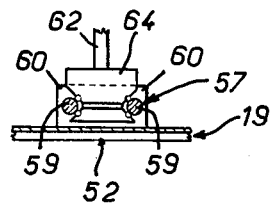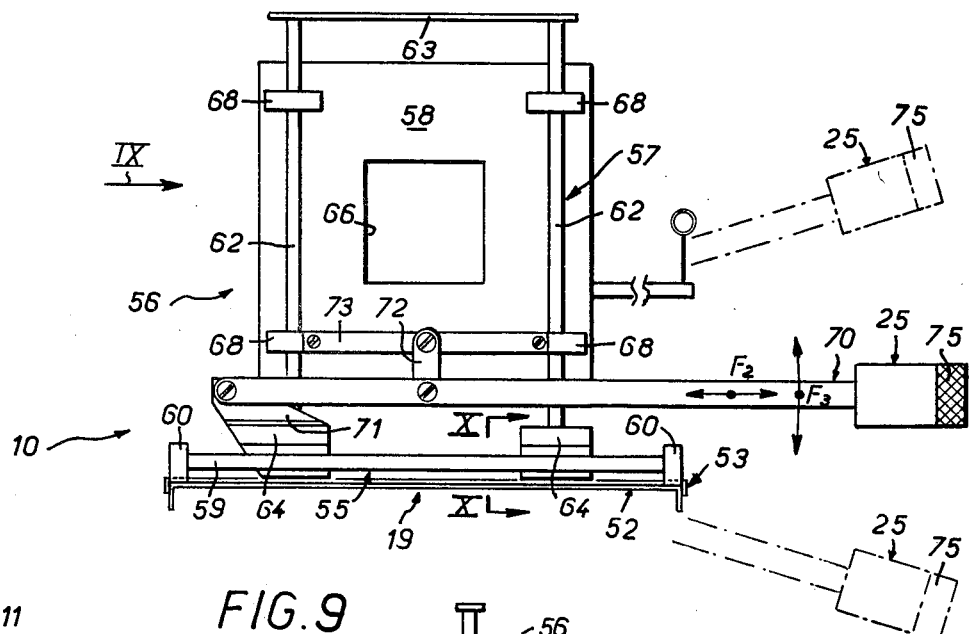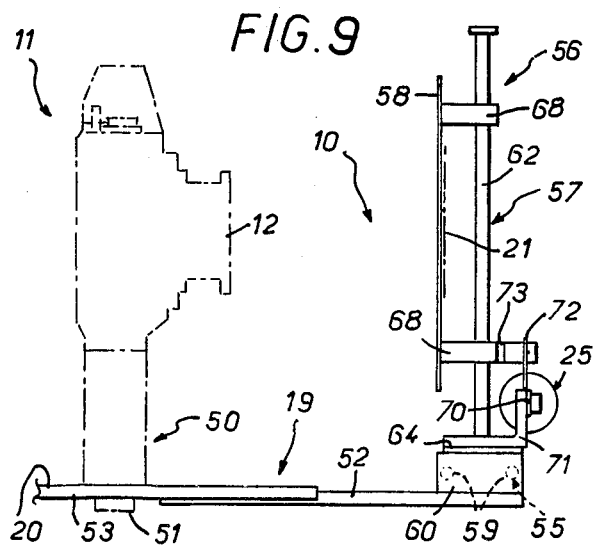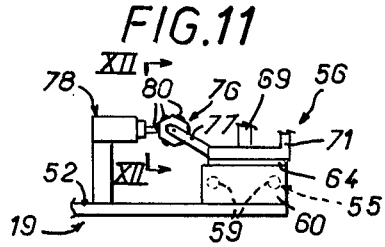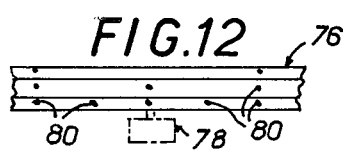

METHOD AND APPARATUS FOR SERIES PHOTOGRAPHY OF A SUBJECT IN MOTION

FIELD OF THE INVENTION

The present invention relates to a method and apparatus using a "still" camera for taking a series of discrete shots on a single frame of film of a subject in motion relative to the camera.

The word "frame" as used herein is intended to mean any kind of photographic film support whether alone or together with other frames, or for positives or negatives. By the term "shot" is intended what is recorded on the film support when all or part of its surface is exposed. By the expression "subject in motion relative to the camera" is intended displacements other than those which are exclusively towards or away from the camera: in other words displacements involving a lateral or transverse component crosswise relative to the field of view of the camera.

As is well known with conventional "still" cameras each shot exposes the entire surface of the frame and the frame records an image at a given point in time.

With a motion picture camera a series of distinct shots are taken of a subject at different points in time but each shot is recorded on a different frame just as if the shots were successively taken with a still camera.

Often, however, it would be interesting to avail oneself of visual information as to a subject at different points in time on a single document, in the present circumstances a series of discrete shots of a subject in motion on the same frame of film.

With a conventional still camera the successive shots or shot sequence of a subject in motion without discontinuities necessarily means, as noted above, for each shot its image covers the entire surface of the frame, and therefore a plurality of shots on the same frame means superpositioning the shots which quickly leads to cluttering making the shots difficult or impossible to distinguish from one another.

To overcome this problem it was proposed during the 19th century by E. J. Marey to effectively eliminate the backdrop behind the subject in motion so that the subject was the only thing lit, reflecting and in motion in front of an all black backdrop. Although such a procedure is capable of producing remarkable results it is hardly suited for every day use.

Such is also the case for the process employed in the 19th century by E. J. Muybridge who in order to obtain a series of stills of a subject in motion used separate cameras at different locations along a film which cameras were operated in rapid succession as the subject passed by.

To achieve such a sought-after document composite photographs are obviously brought to mind, in other words, a juxtapositioning of a series of different photographic documents on a single film support, which lacks, however, the spontaneous qualities of a single photographic document.

Other photomontage or composite processes often involve the use of complicated equipment such as masks taking predetermined positions and/or are impracticable for subjects in motion.

SUMMARY OF THE INVENTION

A general object of the present invention is a method and apparatus using a still camera for taking a series of shots of a subject in motion relative to the camera without discontinuities.

A more specific object of the invention is a method and apparatus of series photography for obtaining a series of shots on one frame.

According to the invention there is provided a method for series photography of a subject in motion using a "still" camera, said method comprising the steps of orienting a loaded camera in a stationary position generally directed at the assumed path of movement of a subject in motion, arranging a field stop between a frame of film in exposable position in the loaded camera and the assumed path of movement of the subject in motion so that the field lens defines an aperture to effectively reduce the field of view of the camera to a portion of the normal total field of view thereof, displacing the field stop in its general plane continuously to follow the displacement of the subject in motion while selectively exposing discrete portions of said frame of film in exposable position in the loaded camera to record a series of shots of the subject in motion on the said frame.

To be sure a still camera is usually equipped with a diaphragm or stop which is most often comprised of a plurality of leaves rotatably mounted in their planes. However, considering such a diaphragm or stop as a whole it is stationary, i.e. the center of its aperture is fixed and in the vicinity of the optical axis of the lens or lens system of the camera, changes in position in the rotatable leaves are only to adjust the size of the aperture. In addition, the function of the diaphragm or stop is to adjust the amount of light flux admitted into the camera for each shot but does not affect the field of view of the camera.

It has already been proposed, in U.S. Pat. No. 3,719,128, to fit a rotatably mounted light shielding cap to the lens barrel of a camera, which effectively masks part of the field. By successive rotation of the light shielding cap it is possible to take a number of discrete shots per frame. However, since the light shielding cap is merely rotatably mounted on the lens barrel its utility is rather limited. Indeed, it is capable of permitting the operator to continuously follow a subject in motion along a particular path of movement.

By contrast the movable field stop according to the invention, which has an adjustable aperture, if desired, is displaceable in all directions in its plane and may take any position in that plane within predetermined limits and therefore is capable of continuously following the movement of the subject in motion irrespective of its path of movement.

The movable field stop limits at all times the field of view of the camera determined by the latter's aperture whereby for each shot only part of the frame is exposed.

From one shot to another the background with respect to which the subject is in motion may be reconstituted without substantial superpositioning of the shots which are liable to reduce sharpness and visibility.

Such a single frame will suffice to reconstitute, for example, the path of movement of a subject moving relative to a background which offers numerous applications in the field of sports or athletics medicine. The clarity of each shot permits an accurate analysis of stances and motions as well as, if necessary, precision measurements with reference to selected background features and marks specially introduced into the background for that purpose.

The present method of series photography which I have chosen to term "macrography" may advantageously be performed with a conventional, currently available camera.

According to another aspect of the invention there is provided an apparatus or accessory for equipping such a camera.

According to this aspect of the invention there is provided apparatus for a still camera comprising a base for mounting such a camera and a field stop mounted at the front of the base for movement in any direction thereon so as to occupy any position in this plane.

In any event, in operation, the movable field stop must be displaced to continuously follow the subject in motion.

As this embodiment incorporates manual control of the movable field stop such manual control is accomplished by associating a movable finder mark coupled for displacement therewith and controlled by an operating member within the operator's reach to enable him to follow the subject in motion to be photographed. Alternatively, it is possible to achieve the same result automatically.

In any event the movable field stop is preferably disposed in a plane located outside the sharp zone of the lens of the particular camera so that the resultant boundary on the frame between the exposed part of the frame and the yet unexposed part remains, advantageously, out of focus.

Several different positions of the movable field stop are possible. When its position not only masks part of the frame but it also reduces the light flux capable of reaching the exposed portion of the frame this reduction of light flux must be taken into account by using sufficiently highly sensitive emulsions to compensate therefor.

These and other features and advantages of the invention as well as various developments thereof will become apparent upon reading the following description, given by way of example, with reference to the accompanying schematic drawings.

BRIEF DESCRIPTION OF THE DRAWINGS

FIG. 7 is a view similar to FIG. 1 for an alternative embodiment of the accessory equipping a camera;

FIG. 8 is an enlarged elevational view of accessory of FIG. 7;

FIG. 9 is a side view taken in the direction of arrow IX—IX in FIG. 8;

FIG. 10 is a partial sectional view taken on line X—X in FIG. 8;

FIG. 11 is a fragmentary view showing a detail of FIG. 9 for another modified embodiment of the accessory embodying the invention; and FIG. 12 is a fragmentary elevational view of the modified embodiment of FIG. 11 taken on line XII—XII of FIG. 11.

DETAILED DESCRIPTION OF THE PREFERRED EMBODIMENTS

Figure 1:
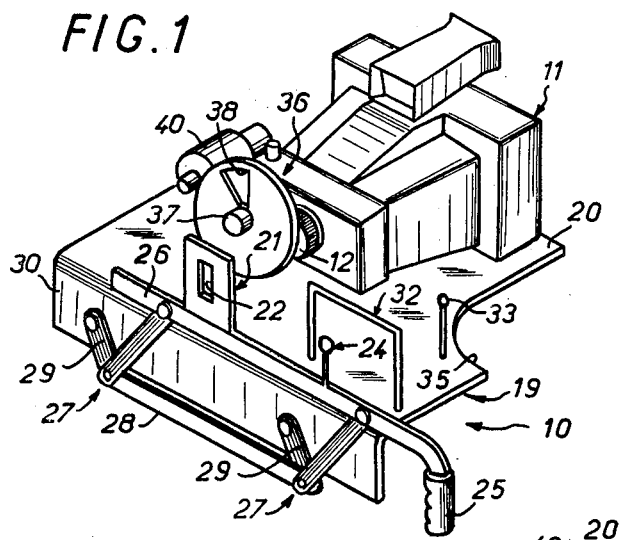
FIG. 1 is a perspective view of a camera associated with an accessory embodying the present invention.
Figure 3A:
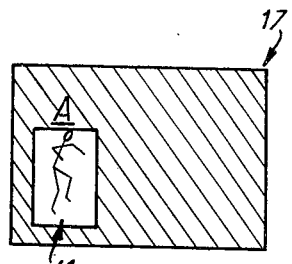
FIGS. 3A, 3B and 3C are views of a frame of film illustrating the exposure of three discrete shots of a subject in motion.

FIG. 1 shows, by way of example, the invention embodied in an accessory for a camera. The accessory is designated by general reference numeral 10 and the associated camera by general reference numeral 11.

Figure 2:
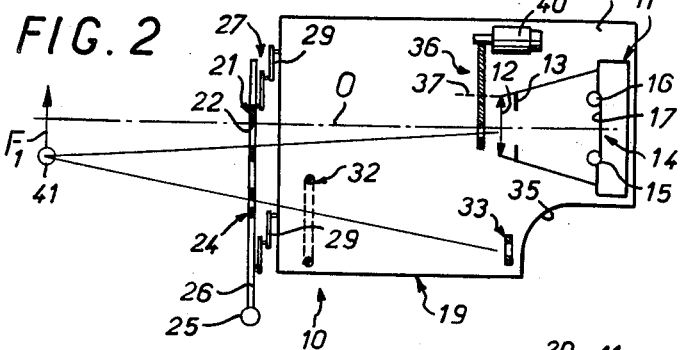
FIG. 2 is a schematic diagram of the accessory and camera in plan view.
Figure 3B:
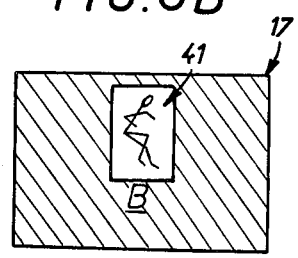

The construction of the camera is known per se and as it does not constitute part of the invention it will not be described in detail herein. Suffice is to say that as diagrammatically illustrated in FIGS. 2, 5 and 6 such a camera 11 comprises a lens or lens system 12 (hereinafter referred to as the lens), a diaphragm 13, a magazine in which a film 14 is adapted to be transported, for example, frame-by-frame from a film feed spool 15 to a take-up spool 16. The optical axis of the lens 12 is designated by reference character 0. The mounting of the diaphragm 13 as a whole is stationary, that is, the center of the aperture defined by the diaphragm is fixed and lies on the optical axis of the lens 12 regardless of the aperture opening which is adjusted by the diaphragm. As usual, the camera 11 also comprises a shutter and frame-by-frame film advance means. Most often the shutter is locked after each shot; the operation of the film advance mechanism unlocks the shutter to permit the next shot to be taken by depressing the shutter release button.

In the following description it will be assumed for the sake of simplifying explanation that the shutter is held permanently in its shooting or open position (as it will appear hereinafter in the embodiment of FIG. 1 another shutter effectively takes its place). In addition it will be assumed that there is no film advance action of the film 14 so that a frame 17 of the film remains in a stationary position in the camera in line with the lens 12 during the taking of a series of shots.

In the embodiments illustrated in FIGS. 1-6, the accessory 10 comprises a base 19 which is essentially a plate as shown and comprises at one of its ends a mount 20 for the camera 11 on the base 19. For securement of the camera the knurled screw which is commonly associated on the camera body for mounting it on a tripod or in case is employed.

At the other end of the base 19 and therefore in front of the camera mount 20 is provided, in accordance with the invention, a field stop 21 which is mounted for movement in its plane laterally or crosswise relative to the optical axis O of the lens 12. As shown the field stop 21 may comprises a simple opaque plate having an aperture 22 in the middle thereof, for example, a rectangular aperture. The field stop 21 extends laterally relative to the optical axis O of the camera 11 and as it is disposed in front of the camera 11 it defines, at all times, the field of view of the camera so as to limit the normal total field of view of the camera to a portion thereof. In order not to overcrowd FIG. 1 the dimensions of the opaque plate forming field stop 21 have been intentionally reduced in size.

In case of direct view finding of the subject by the operator a movable finder mark 24 is coupled to the field stop 21 for displacement therewith. As shown the movable field mark 24 and the field stop 21 are controlled by a common operating member which is a simple depending handle 25 in the illustrated embodiment which is within the operator's reach and which he may grip between his fingers.

In practice the movable field stop 21 and the movable finder mark 24 are both carried by a support bar 26 to which the handle is fixed at one of its ends. The support bar 26 defines one side of a four-bar linkage 27, and the side or bar 28 opposite the support bar 26 is connected to the base 19 by two parallel links 29 articulated at their respective ends to the bar 28 and a depending flange 30 of the base 19 provided for this purpose.

It follows that with such a mounting the field stop 21 is movable in all and any directions in its plane in order to occupy any position in that plane, and the movements of the field stop 21 and the movable finder mark 24 coupled thereto are synchronized.

Associated with the movable finder mark 24 is a fixed viewfinder frame 32 carried on the base 19 and a fixed finder mark 33, e.g. a small circular finder window, which too is mounted on the base on the opposite side of the viewfinder frame 32 from the movable finder mark 24. Preferably the outer contour of the viewfinder frame 32 is beyond the image exposable on the rectangular frame of the film. Advantageously cross hairs or a reference grid markings (not shown) may be associated with the viewfinder frame 32. This feature may take the form of ground glass or a network of metal wires. Preferably the reference grid markings extend beyond the viewfinder frame 32 to facilitate the following of the subject in motion even before it enters the limits of the viewfinder frame. Preferably, the viewfinder frame 32 is interchangeable so as to be adaptable to the lens 12 of the camera. Accordingly, the base 19 has two holes in which the support legs for the viewfinder frame may be removably mounted and secured to the base 19.

Preferably the fixed finder mark 33 is mounted proximate to the edge of a notch 35 in the base 19 which, advantageously, is adapted to serve as a head rest. The notch itself may in fact constitute a fixed view marker.

Since as assumed above, the shutter of the camera is maintained in its open position, the accessory is provided with a shutter 39 which effectively replaces the integrated shutter of the camera 11. In the illustrated embodiment the shutter 39 on the accessory comprises an opaque disc rotatably mounted about a pivot 37 the axis of which is parallel to optical axis O of the lens 12, the opaque disc intersecting the optical axis O. The disc is provided with at least one discrete opening 38 which is adapted to uncover the lens 12 once per revolution. The opaque disc may be rotated manually, or automatically as shown. In the latter case it is driven by a drive motor 40 the output shaft of which is, for example, in direct friction drive contact with the periphery of the disc. The speed of the drive motor is preferably variable.

In accordance with another, nonillustrated arrangement, the accessory shutter is of the usual diaphragm type permitting the operator to control, at will, the exposure time of a series of shots.

In any event considering that the objective is to make a series of discrete shots of a subject 41 in motion on a single frame of film the accessory is used in the following manner. The accessory 10 and the associated camera 11 are secured in any suitable manner to a support (not shown) assumed to be stationary. In addition it will be assumed that the orientation thus imparted to the camera 11 is such that the subject to be viewed and photographed is in substantially lateral motion relative to the optical axis O of the camera as indicated diagrammatically by arrow $F_1$ in FIG. 2. (In fact the subject would just as well be in motion at an angle relative to the axis O of the camera in which case it would still have a lateral component of displacement).

By controlling the operating member 25 the operator endeavors to maintain the movable finder mark 24 in alignment with the fixed finder mark 33 and therefore with the subject 41 being viewed. (It is to be noted in the instant embodiment that the operator does not make use of the viewfinder on the camera although it is represented in FIG. 1. According to a nonillustrated embodiment of an appropriate mechanism provides similar, synchronous displacement of the movable field stop in the viewfinder.)

Because of the motion of the subject being viewed it is necessary for the operator to similarly displace the movable finder mark 24. This displacement causes a concomitant displacement of the movable field stop 21 so that the portion of the field of view of the camera exposed by the field stop 21 varies progressively with the continuous picture-taking. In other words in the illustrated embodiment this means progressively with the rotation of the rotary disc shutter 36. (If as mentioned above, the rotary shutter 36 is of the diaphragm type, a shot is taken by the operator each time the subject has moved appreciably across the viewfinder frame 32; the operator judges this displacement by the grid markings associated with the viewfinder frame).

For instance, for the first shot of the frame (see FIG. 3A) the only part to be exposed is the zone A of the frame 17 located at the lower left thereof. For the second shot (FIG. 3B) only a zone B of the frame 17 which is located substantially in the upper middle part of the frame will be exposed. For the third shot (FIG. 3C) the zone C of the frame at the lower right of the frame will be exposed.

Figure 4:
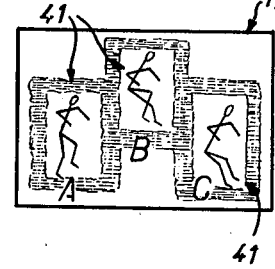
FIG. 4 is a view of the composite frame combining the three exposures of FIGS. 3A, 3B and 3C.

Of course, taking into account the structure of the accessory 10 for each shot the subject in motion or part of the subject is properly framed by the field stop 21 so that the three successive shots of the subject corresponding to three different moments of its path of movement are grouped on the same film frame 17 (FIG. 4).

Taking the example of the broad jumper as diagrammatically shown in stick figures, the first shot A shows the start, the second shot B the actual jump, and the third shot C the landing.

Subject, of course, to the shots being sufficiently physically shaped from one another there is no overlapping despite there being effectively continuous shots so that each shot is clear and not superimposed on the background against which the subject 41 is in motion. Indeed only the part of the background in the immediate vacinity of the subject in motion at the instant of the shot is included, the remainder of the background being masked by the field stop 21 as schematized by the hatched areas in FIGS. 3A, 3B and 3C.

However, the background may at least in part be reconstituted as represented by the hatched portions in FIG. 4 constituting the unsharp peripheral area forming the boundary zone between each of the shots and the rest of the frame of the film which is not exposed.

In the foregoing the field stop 21 extends freely at the front of the camera 11 without any other optical accessory. Preferably the field stop 21 is at such a distance from the camera 11 that it is located outside the sharp zone of the image recorded on the frame 17 so that the resulting boundary between the exposed part of the frame and the masked part remains unsharp. In practice the boundary zone may be reduced to the limits of perceptibility, in which case the background of the shots then appears in continuity on the exposed frame.

Furthermore it is provided according to the invention not only to take successive shots of the subject on the frame but also beyond the actual path of movement of the subject to take shots of the background alone to complete the background of the discrete shots.

Figure 5:
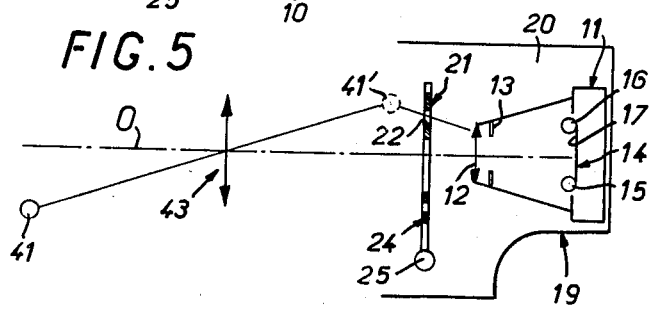
FIG. 5 is a schematic optical diagram similar to that of FIG. 2 for a different embodiment of the accessory embodying the invention.
Figure 3C:
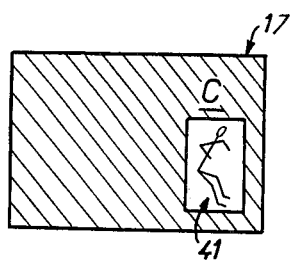

According to the modified embodiment of FIG. 5, the base 19 which is partly represented in that figure for the sake of simplicity, also carries an optical system 43 disposed beyond the field stop 21 relative to the camera 11. The optical system 43 is adapted to focus an image 41' of the subject 41 between the optical system and the camera 11. The image 41' may or may not be formed on a ground glass screen. In any event the lens 12 of the camera 11 captures the image 41' focusing it in turn on the film 14.

As previously, during each shot the field stop 21 masks an appreciable part of the field of view of the camera 11, and only a portion of the frame 17 of the film 14 is exposed.

Figure 6:
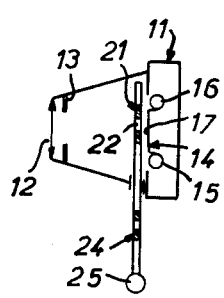
FIG. 6 is a schematic optical diagram of a camera provided with a movable field stop.

According to the modified embodiment diagrammatically represented in FIG. 6 the field stop 21 may be integrated into the camera 11 in the immediate proximity of the film 14. In this case to compensate for possible lateral deviations of the field stop 21 the advance of the film 14 is performed in such a manner that at all times the frame 17 to be exposed is located in a plane offset forwardly relative to the spools over which the film is wound.

FIGS. 7-10 refer to an alternative embodiment of the invention.

In FIG. 7 in solid lines and FIG. 9 in chain-dotted lines is shown a reflex camera designated by general reference numeral 11. The construction of reflex cameras is well known per se and as it is not part of the present invention will not be described in detail herein.

In the embodiment of FIGS. 7-10 the camera 11 is associated in a manner known per se with a motor drive 50 which permits a series of pictures to be taken automatically at adjustable speeds which at the present day ranges up to 2-4 images per second.

As described above the camera 11 and its drive motor 50 which together form a single unit are mounted on an accessory 10 provided with a field stop 21 in front of the lens 12 of the camera 11. The base 19 of the accessory 10 is formed in two parts longitudinally displaceable with respect to each other, namely, a forward part 52 which carries the field stop 21 as described in greater detail hereinafter and a rear part 53 which includes a mount 20 on which the camera 11 with its motor drive 50 are fastened, e.g. with a screw 51 (FIG. 9).

It is thus possible to adjust the axial distance between the field stop 21 and the lens 12 of the camera 11 as a function, essentially, of the particular lens.

For example as shown, parts 52 and 53 of the base 19 are in telescopic relationship with a dovetail connection (not shown in the drawings). In addition the field stop 21 is mounted for sliding movement in two directions respectively perpendicular and parallel to the general plane of the base 19. Accordingly, the forward part 52 of the base 19 carries a first rectilinear guide 55 extending horizontally and substantially perpendicular to the optical axis of the lens 12 of the camera 11. A frame member 56 is slidably mounted on the guide and in turn carries a second rectilinear guide 57 extending vertically upwards and perpendicularly to the first guide 55. A support 58 for the field stop is mounted on the second guide 57.

In FIG. 7, for reasons which will appear hereinafter and for the sake of enhanced clarity, the field stop 21 is shown exploded, i.e., spaced from support 58. Likewise the field stop 21 is not shown in FIG. 8 and shown in chain-dotted lines in FIG. 9.

In the FIGS. 7-9 embodiment the guide 55 comprises two bars 59 extending parallel to each other between two flanges 60 fixed to the sides of the forward part 52 of the base 19.

The frame 56 comprises two rods 62 which together define the guide 57; rods 62 extend parallel to each other and are braced at their upper ends by a cross bar 63. The lower ends of the rods 62 are carried by sliders 64 in dovetail relationship with the bars 59 defining the guide 55 (FIGS. 8 and 10).

In the embodiment of FIGS. 7-9 the support 58 comprises a mere plate on which the field stop 21 is removably mounted, for example, by magnetic means. The support 58 is made at least in part of magnetic material and the field stop 21 which itself is in the form of a plain plate is made at least in part of ferromagnetic material. The field stop 21 may be cut from a blank of the material sold under the trademark Feripel.

Alternatively, the field stop 21 may be secured to the support 58 by fabric fasteners such as those sold under the trademark Velcro. It may also secured by an adhesive, all or part of its surface being covered with such an adhesive.

In any event the support 58 has an opening 66 and the field stop 21 which also has an opening 67 is mounted at the perimeter of the opening 66 on the support 58 as shown schematically in chain-dotted lines in FIG. 7. Also, projecting from the support 58, as shown, are lugs 68 by which it is slidably mounted on the rods 62 of guide 57. In this way the support 58 thus contributes to the rigidity of the frame member 56 of which the rods 62 are an essential part.

Thus the field stop 21 and therefore in practice its support 58 are controlled by the operating member which is in the form of a simple handle 25. In the illustrated embodiment of FIGS. 7-9 the handle 25 is carried at the end of a lever 70 pivotally mounted on the movable frame 56 by means of an angle iron 71 fixed on one of the sliders 64. By means of a link 72 the lever 70 is attached to support 58 for the field stop 21, the link 72 being pivoted on the lever 70 spaced from the latter's pivot axis and also pivoted on a bar 73 interconnecting the two lower lugs 68 of the support 58.

As will be readily understood, by pulling or pushing the handle 25 in the directions of the double-headed arrow $F_2$ in FIG. 8, it is possible to displace the movable frame 56 along guide 55 thereby displacing the field stop 21 in a first direction, and by pivoting or swinging the lever 70 to which the handle 25 is attached in the directions of the double-headed arrow $F_3$ in FIG. 8 as represented in chain-dotted lines in that figure, it is possible to displace the support 58 along the second guide 57 and therefore the field stop in a second direction perpendicular to the first direction so that within the limits of permitted displacements in the plane the field stop 21 may occupy any position in that plane and thus is movable in any and all directions therein.

Preferably, as described above, a movable finder mark 24 is associated with the field stop 21, and correspondingly the base 19 and more particularly the rear part 53 thereof has a viewfinder frame 32 and a fixed finder mark 33. Preferably, the movable finder mark 24, which is carried by the support 58, is substantially at the height of the optical axis of the camera 11.

The accessory 10 just described with reference to FIGS. 7-9 operates as previously explained. The accessory 10, which carries the camera 11 and its motor drive 50 is mounted on a stationary support (not shown) and with a film immobile in the camera, a series of shots are taken on the same frame of the film of a subject laterally in motion relative to the optical axis of the lens of the camera by uninterruptedly following continuously the subject with the assistance of the finder marks 24 and 33 and displacing the field stop 21 with handle 20 accordingly so as to keep the marks in registry.

It will be noted that advantageously the field stop is interchangeable so that its aperture, which is not necessarily square or rectangular, may be adapted to the general configuration of the subject to be photographed.

According to a further feature adjustment means may be provided for adjusting the shape and/or size of the aperture of the field stop 21 in the course of shooting a series of shots. Such a field stop may, for example, be a conventional circular diaphragm as usually found in cameras themselves. Alternatively, the adjustment means may comprise a diaphragm defining a rectangular aperture; two opposed sides of the rectangular aperture are defined by a first pair of coplanar plates movable in their common plane for displacement towards or away from each other and the other sides by another similar pair of plates (none of which are illustrated).

In any event the adjustment means for controlling the field stop 21 is preferably carried, for example, at the end of the operating member defined by the handle 25 and is in the form of a knurled knob 75 rotatably mounted on the operating member as shown in FIGS. 7 and 8.

Such an adjustable field stop may advantageously vary the dimensions of the aperture defined thereby as a function of the apparent size of the subject being photographed which may vary owing to its very displacement, which may comprise, though not exclusively, a component of displacement towards or away from the camera.

As described hereinabove the number and timing of the series of shots of the subject on the same frame of the film may be left to the discretion of the operator particularly as a function of the path of movement of the subject. Nonetheless according to a further development of the invention, automatic repeat shutter release may be provided as the subject proceeds on its path of movement, particularly when the path of movement is known in advance.

To this end, as schematically illustrated in FIGS. 11 and 12, the movable frame 56 is equipped, parallel to guide 55 thereon, with a preprogramed actuator bar 76 which is held at its ends by arms 77 and extends from one of the sliders 64 of the movable frame to the other, each of the arms 77 being supported by one such slider.

As illustrated in FIGS. 11 and 12, the preprogramed actuator bar 76 is in the form of a bar of hexagonal cross section rotatably mounted like a revolver cylinder on the arms 77.

Facing the preprogramed actuator bar 76 is control means 78 adapted to control the shutter release mechanism of the camera. The control means may be a switch, e.g. a microswitch, coupled to the shutter release mechanism of the camera. On at least one of the longitudinal sides of the preprogramed actuator bar 76 facing the control means 78 are provided a plurality of actuating members 80 spaced longitudinally along this side, uniformly or according to some other predetermined spacing order. In practice, each of the longitudinal sides of the preprogramed actuator bar 76 carries the actuating members 80 with different spacings. For example if uniform spacing of the actuating members is desired, the number of actuating members on one of the longitudinal sides may differ from that on another side of the actuator bar 76.

In case the control means 78 is an electrical switch as shown, the actuating members 80 may simply be bosses or cams protruding outwardly from the actuator bar 76.

Alternatively, however, the control means may be a photoelectric cell in which case the actuator bar is then hollow and accommodates a lamp; the actuating members then comprise transverse slots along the longitudinal sides of the actuator bar 76. Thus a series of shots are automatically triggered by the progressive displacement of the field stop 21 along its corresponding path of movement.

As a function of the foreseen speed of the subject in motion and the nature of its path of movement, the operator may select the longitudinal side of the actuator bar 76 taking into account the number of actuating members 80 and/or the spacing between these actuating members.

Of course, if desired, the shutter release action may be automatic, e.g. periodical, at a rate preselected by the operator, or in accordance with some other timing order.

In any event the exposure time and the shutter release repeat rate are preferably adjustable independently of each other. It is accordingly possible to adjust the exposure time as a function of the light and the interval between shutter releases as a function of the speed of the subject in motion and its orientation relative to the camera. However, if desired, the exposure time may be selected beforehand.

According to another development of the invention, not illustrated in the drawings, the automatic shutter release may also be aperiodical so as to be triggered in progression with the continuous displacement of the field stop, by an automatic "follower" means responsive to the displacement of the subject being viewed, e.g. optical or ultrasonic means.

The displacement of the field aperture itself may be controlled automatically by a suitably programed control if the displacements of the subject can be precisely known beforehand, such as is the case with a runner whose running speed is adequately known for the desired speed for displacement of the field stop to be determined beforehand as well as the shooting rate of the series of shots starting from a set point in time.

A more elaborate automatic control means may be used to control the displacement of the field stop 21 automatically in accordance with the speed of displacement of the subject to be photographed.

For example the image of the subject on the screen of an iconoscope fixed on the camera may be detected and serve as control signal for the displacement of the field stop in order to follow the displacements of the subject in motion.

Furthermore, in order to improve lighting conditions it is possible to utilize light sources conventionally used in photography such as stroboscopic light or aperiodical electronic flash units. The source of light is oriented towards the subject by connecting the lighting source to variable direction support means and controlling the direction thereof in accordance with the displacement of the field stop.

The present invention is not intended to be limited to the embodiments illustrated and described herein but on the contrary includes all modifications, variations and alternatives understood to those having ordinary skill in the art which may be resorted to without departing from the scope of the invention as defined by the appended claims.

The present invention is readily adaptable to reflex cameras. In this case the movable finder mark is formed by the image of the field stop in the viewfinder of the camera itself.

The accessory may obviously be incorporated into the camera, the base carrying the field stop then being integrally formed with the camera body or the motor drive.

Whether the base is independent of or integrally formed with the camera body or motor drive, in order to make the unit more compact the fixed finder mark may advantageously be provided along the long side of the camera and not its short side as with the embodiments depicted herein.

In any event and besides artistic effects which may be desired, the invention is susceptible to various applications other than sports medicine mentioned above, namely scientific applications bearing in mind the information as to displacements as a function of time which it produces on one permanent document. In particular the invention may be employed in the physiological and/or pathological studies of patients such as limping patient before and after therapy.

What I claim is:

1. Apparatus for series photography of a subject in motion, said apparatus being adapted to be associated with a "still" camera, a field stop defining an aperture sized and positioned to effectively reduce the total field of view of the associated camera, means mounting said field stop in front of said associated camera for movements in all directions in the general plane of said field stop, means for displacing said field stop to follow displacements of the subject in motion, and means for adjusting the shape and/or size of aperture of said field stop.

2. Apparatus for series photography of a subject in motion, said apparatus being adapted to be associated with a "still" camera and comprising a base, means on said base for mounting a still camera, a field stop defining an aperture sized and positioned to effectively reduce the total field of view of the associated camera, means mounting said field stop in front of said means for mounting the associated camera for movements in all directions in the general plane of said field stop, means for displacing said field stop to follow displacements of the subject in motion, and means for manually controlling a shutter release mechanism of the associated camera.

3. A camera accessory for series photography of a subject in motion, said camera accessory being adapted to be associated with a conventional "still" camera and comprising a base, means on said base for mounting the still camera, a field stop defining an aperture sized and positioned to effectively reduce the total field of view of the associated camera, means mounting said field stop on said base in front of said means for mounting the associated camera for movements in all directions in the general plane of said field stop, and means mounted on said base for displacing said field stop, to follow displacements of the subject in motion.

4. Apparatus for series photography of a subject in motion, said apparatus being adapted to be associated with a "still" camera and comprising a base, means on said base for mounting a still camera, a field stop defining an aperture sized and positioned to effectively reduce the total field of view of the associated camera, means mounting said field stop in front of said means for mounting the associated camera for movements in all directions in the general plane of said field stop, and means for displacing said field stop to follow displacements of the subject in motion with a plurality of discrete portions of a frame of a film corresponding to the size of the predetermined field stop aperture being exposeable to photograph the subject in motion in a series of positions along its path of displacement.

5. Apparatus according to claim 4, wherein said field stop is carried on a bar comprising one side of a four-bar linkage.

6. Apparatus according to claim 4, said means mounting said field stop permitting movement in two mutually perpendicular directions, wherein said means mounting said field stop comprises a first rectilinear guide mounted on said base, a frame member slidably mounted on said first guide a second rectilinear guide carried by said frame member and extending perpendicular to said first guide, a support for said field stop being slidably mounted on said second guide, an actuator bar being disposed on said frame member parallel to said second guide, said actuator bar having a plurality of actuating members along a longitudinal side thereof, control means mounted on said base and facing said actuator bar, said control means being adapted to be actuated by said actuating members on said actuator bar in the course of displacement of said frame member, said control means being adapted to be connected to a shutter release means of the associated camera.

7. Apparatus according to claim 4 or 3, comprising a movable finder mark coupled for movement with said movable field stop, said means for displacing said field stop including an operating member coupling said field stop to said finder mark for displacing them together.

8. Apparatus according to claim 7, further comprising associated with said movable finder mark a viewfinder frame mounted on said base whereby displacement of said movable finder mark relative to said viewfinder frame effectively simulates displacement of the subject in motion relative to field of view of the camera.

9. Apparatus according to claim 7, further comprising associated with said movable finder mark a finder mark fixed to said base.

10. Apparatus according to claim 7, wherein said field stop and said movable finder mark are both carried on a bar comprising one side of a four-bar linkage, the opposite side of said four-bar linkage being connected to said base by parallel links.

11. Apparatus according to claim 4, said means mounting said field stop permitting movement in two mutually perpendicular directions, wherein said means mounting said field stop comprises a first rectilinear guide mounted on said base, a frame member slidably mounted on said first guide, a second rectilinear guide carried by said frame member and extending perpendicularly to said first guide, and a support for said field stop being slidably mounted on said second guide, said means for displacing said field stop comprising a manually controlled operating member carried by a lever pivotally mounted on said frame member, and a link attaching said lever to said field stop support, said link being pivoted on said lever spaced from the latter's pivot axis and on said field stop support.

12. Apparatus according to claim 11, comprising an actuator bar disposed on said frame member parallel to said second guide, said actuator bar having a plurality of actuating members along a longitudinal side thereof, control means mounted on said base and facing said actuator bar, said control means being adapted to be actuated by said actuating members on said actuator bar in the course of displacement of said frame member, said control means being adapted to be connected to a shutter release means of the associated camera.

13. Apparatus according to claim 12 or 6, said actuator bar being rotatably mounted about its longitudinal axis and having different numbers of actuating members on at least two sides thereof.

14. Apparatus according to claim 4, said means mounting said field stop permitting movement in two mutually perpendicular directions, wherein said means mounting said field stop comprises a first rectilinear guide mounted on said base, a frame member slidably mounted on said first guide, a second rectilinear guide carried by said frame member and extending perpendicularly to said first guide, and a support for said field stop being slidably mounted on said second guide, means for removably mounting said field stop on said support therefor comprising magnetic material of which a selected one of said field stop and said field stop support is at least in part made of, and ferromagnetic material of which the nonselected one of said field stop and said field stop support is at least in part made of, said field stop support having an opening, and said field stop being mounted along the perimeter of said opening in said field stop support.

15. Apparatus according to claim 4, said means for displacing said field stop comprising a manually controlled operating member, further comprising means for adjusting the shape and/or dimensions of said aperture in said field stop including a knob mounted at an end of said operating member.

16. Apparatus according to claim 4 or 3, wherein said base comprises two relatively movable parts including a forward part and a rear part, said means mounting said field stop being disposed on said forward part, and said means for mounting the associated camera being disposed on said rear part.

17. Apparatus according to claim 4, comprising means for orientably supporting a light source on said base, means coupling said means for supporting a light source to said field stop so that the orientation of said supporting means for a light source corresponds to the displacement of said field stop.

18. Apparatus according to claim 4, comprising means responsive to the displacement of the subject in motion for automatic release of a shutter release mechanism of the associated camera in time with the continuous displacement of said field stop.

19. Apparatus according to claim 4, further comprising optical means mounted on said base and disposed beyond said movable field stop relative to said means for mounting the associated camera for focusing an image of the subject in motion between itself and said means for mounting.

20. Apparatus according to claim 4 or 3, comprising a shutter being mounted on said base in front of said means for mounting the associated camera, means for controlling said shutter for periodically or non periodically exposing images of the subject in motion, of said one frame of the film in the associated camera.

21. A method according to claim 4, wherein said field stop is positioned in a plane located beyond the focusable zone of the camera.

* * * * *